Patented Dec. 9, 1941

2,265,320

UNITED STATES PATENT OFFICE 2,265,320

PROCESS OF MAKING A CONCENTRATE OF VITAMIN D₂ IN EVAPORATED MILK

Reginald C. Sherwood, St. Paul, and Charles G. Ferrari, Minneapolis, Minn., assignors to General Mills, Inc., a corporation of Delaware No Drawing. Application November 15, 1939, Serial No. 304,548

4 Claims. (Cl. 99—11)

The present invention relates to a vitamin $D_2$ concentrate comprising a stable sterilized emulsion of activated ergosterol, a butter-fat solvent for the ergosterol and an evaporated milk carrier for both the ergosterol and butter fat and more particularly to a process of producing such a concentrate.

This application is a continuation in part of our application Serial No. 220,506, filed July 21, 1938, now Patent No. 2,245,418, for Concentrated vitamin D in evaporated milk and process of producing the same.

The principal object of our invention is to provide a process for the preparation of a stable, sterilized emulsion of vitamin $D_2$ consisting of activated ergosterol, a butter-fat or butter-oil solvent therefor, and an evaporated milk carrier for both the ergosterol and the butter-oil or butter-fat, wherein the emulsion may be formed without the addition of an extraneous emulsifying agent.

Another object of our invention is to provide a stable, sterilized emulsion of vitamin $D_2$ consisting of activated ergosterol, a butter-fat or butter-oil solvent therefor, and an evaporated milk carrier for both the ergosterol and butter-oil or butter-fat, said emulsion being capable of being canned and heated to a temperature of about 240° F. to 242° F. for about twenty minutes to sterilize the same without breaking the emulsion or appreciably reducing the vitamin $D_2$ potency thereof.

A further object of our invention is to provide a process for the preparation of a stable, sterilized emulsion of vitamin $D_2$ which comprises dissolving a suitable amount of activated ergosterol in butter-fat or butter-oil, adding a suitable amount of untreated evaporated milk thereto, and passing the product through a homogenizer under high pressure, then recirculating the product through the homogenizer under low pressure thereby producing a stable emulsion of the ingredients and finally canning and sterilizing the product.

A still further object of our invention is to provide a process for the preparation of a stable, sterilized emulsion of vitamin $D_2$ in evaporated milk which comprises dissolving activated ergosterol in butter fat or butter oil, mixing a small quantity of the concentrate with a suitable amount of unsterilized evaporated milk and passing the product through a homogenizer, then mixing the homogenized product into a vat of untreated unsterilized evaporated milk, and then again homogenizing the product under the same conditions of pressure as were employed in the first homogenization of the product and finally canning and sterilizing the product thereby producing a stable sterilized emulsion of vitamin $D_2$ having a substantially unimpaired vitamin $D_2$ potency.

A still further object of our invention is to provide a butter-fat concentrate of vitamin $D_2$ which is especially adapted to be added to dairy products such as milk thus avoiding the addition of a foreign fat to the milk.

These and other objects and advantages of our invention will be more readily apparent from a consideration of the following detailed specification in conjunction with the appended claims.

It has heretofore been customary to impart vitamin D properties to dairy products such as milk by exposing the milk or other product to the action of ultra-violet radiant energy. The sterols present in the milk were changed by the ultra-violet radiant energy to vitamin D. According to the commercial application of this method of treatment, it was necessary to expose the milk in a thin film to the ultra-violet radiant energy. This method necessitated the use of considerable expensive equipment, such as means for producing the thin film of milk, and electrical equipment to produce the ultra-violet radiant energy. This equipment necessarily occupied considerable space in the plant in which it was installed. Frequently milk treated by this method will have a foreign flavor imparted thereto. In addition to the action on the sterols in the milk, the ultra-violet radiant energy causes certain undesirable chemical reactions to occur in the milk which limits to a lower level than is desirable, the antirachitic activity of the irradiated milk.

Also, it has been customary to impart vitamin D properties to milk and other dairy products by adding thereto fish oil concentrates containing both vitamins A and D. However, this method was disadvantageous in that it adversely affected the flavor of the milk by reason of the fact that such fish oil concentrates contain certain fats and odoriferous amines which are foreign to milk and impart a fish-oil flavor and odor thereto. For example, Briod and East Patents Nos. 2,150,315 and 2,150,316, show the addition of a vitamin A and D concentrate consisting of the unsaponifiable fraction of cod-liver oil to evaporated milk or cream which is subsequently emulsified and then used to fortify food products, such as milk. Such a method, however, is disadvantageous in that the vitamin D potency of the concentrate is low, that is, about 10,000 U. S. P. units of vitamin D per gram of concentrate, and further, the concentrate imparts a highly objectionable fishy odor and flavor to the evaporated milk or cream to which it is added.

Our invention is based upon the discovery that the above-mentioned difficulties may be obviated and that a stable, sterile, highly potent vitamin $D_2$ concentrate may be prepared which when added to other products, such as milk, results in the product having no foreign taste, odor, or foreign fat imparted thereto by processes which will be hereinafter described.

Broadly, our processes comprise dissolving activated ergosterol, in suitable quantity, in butter-oil (butter-fat), thereby producing a butter-fat concentrate of vitamin $D_2$, melting a weighed quantity of the concentrate, and homogenizing the concentrate with a small quantity of unsterilized, evaporated milk, then adding the homogenized product to a vat containing a large bulk of unsterilized, evaporated milk which is to be fortified, then uniformly distributing the concentrate in the evaporated milk by mixing, and then homogenizing, canning, and sterilizing the product by heating it to a temperature of about 240° to 242° F. for about 20 minutes.

In practicing our invention, we dissolve previously activated ergosterol in butter-oil or butter-fat, thereby producing a butter-fat concentrate. This concentrate may contain from 100,000 to 1,000,000 U. S. P. units of vitamin $D_2$ per gram of butter-oil or butter-fat. If desired, this concentrate may be bioassayed to determine its vitamin $D_2$ potency. A required quantity of this concentrate is then melted and mixed with a small quantity of unsterilized evaporated milk, in the proportion of approximately 5 pounds of butter-fat concentrate to approximately 1 to 2 gallons of unsterilized evaporated milk, which is removed from a milk vat prior to its sterilization and canning. This product is then homogenized or emulsified by any suitable means, such as by passing it through an Eppenbach emulsifier or other suitable small laboratory emulsifiers. This emulsified product is then added to the vat of milk which it is desired to fortify with vitamin $D_2$ and thoroughly mixed therewith by any suitable means. This fortified concentrated product is then subjected to the remaining steps required to produce canned evaporated milk, namely, it is passed through a plant homogenizer where it is again homogenized under the conditions of pressure which are employed in homogenization of evaporated milk, canned, and sterilized by heating it to a temperature of about 240° F. to 242° F. for about 20 minutes.

As an alternative to the above-described process, we may produce a stable, sterilized emulsion of vitamin $D_2$ in evaporated milk by a process which comprises dissolving a suitable amount of activated ergosterol in butter-fat, or butter-oil, adding a suitable amount of untreated evaporated milk thereto, and passing the product through a homogenizer while subjecting it to a high pressure of say approximately 4000 to 5000 pounds per square inch, then recirculating the partially homogenized product through the homogenizer while subjecting it to a low pressure, of say, about 2500 pounds per square inch thereby producing a stable emulsion, and finally canning the product and sterilizing it by heating it to a temperature of about 240°-242° F. for about 20 minutes.

This fortified vitamin $D_2$ evaporated milk concentrate may then be used to fortify untreated milk, cereal or dairy products, or other foods, by adding a suitable quantity of it to such milk, products, or other foods. For example, we prepare a vitamin $D_2$ evaporated milk concentrate in a 5.8 ounce can containing 600,000 U. S. P. units of vitamin $D_2$, sufficient to fortify 1500 quarts of milk at the rate of 400 U. S. P. units of vitamin $D_2$ per quart, which is the quantity recommended by competent scientific authority.

When our improved vitamin $D_2$ containing concentrate is used by dairies to fortify milk with vitamin $D_2$, no expensive or elaborate equipment is required since it is only necessary to measure the required amount of vitamin $D_2$ concentrate in a graduate and pour it directly into the pasteurizing vat preferably just prior to pasteurization. The vitamin $D_2$ is already homogenized in the evaporated milk and complete dispersion throughout the batch of milk to be vitaminized is obtained by the agitation received by the milk during pasteurization. Furthermore, no disagreeable taste or odor is imparted to the milk by the addition of the vitamin concentrate thereto and the vitamin $D_2$ is not impaired by the heat to which the evaporated milk is subjected during the pasteurization and sterilization operations.

By using our improved vitamin $D_2$ concentrate for the fortification of milk, a natural product, namely, butter-fat is added to a natural product, namely, milk. Since both products are natural products which are mutually compatible, the food value of the resulting product is enhanced. Also, evaporated milk is a natural colloid and forms an ideal food substance for dispersing homogeneously butter-fat containing vitamin $D_2$ and keeping the vitamin in homogeneous dispersion until it is used.

The evaporated milk in our invention, does not merely serve as a carrier for the vitamin. The milk imparts its food value when consumed by the consumer, and the butter-fat solution not only imparts the vitamin $D_2$ property to the milk, but also cooperates with the milk to increase its nutritional qualities as stated above. In other words, there is a mutual cooperation between the milk and the butter-fat solution.

By "vitamin concentrates" is meant preparations having a potency higher than that of foods irradiated or fortified to increase their vitamin content and which are intended to be consumed by humans as ordinary foods. For purposes of illustration, a preparation having a vitamin $D_2$ potency of five hundred units per gram and which is intended for use in fortifying articles of food, as for instance candy, is a vitamin $D_2$ concentrate. Of course, the actual potencies of concentrates made in accordance with this invention may vary over wide ranges, as will be evident to those skilled in the art.

The following specific example will serve to illustrate and explain a use of our invention. To prepare 300 pounds of bread requires approximately 1 barrel of flour (weighing about 200 pounds). If it is desired to prepare bread containing 500 U. S. P. units of vitamin $D_2$ per pound of bread, the baker proceeds with the preparation of a dough mix according to the usual formula and procedure, in which yeast and water are first mixed to form a suspension. After the yeast and water have been mixed together, 104 cubic centimeters of vitamin $D_2$ concentrate in evaporated milk, produced as described above, containing 1600 U. S. P. units of vitamin $D_2$ per cubic centimeter, is measured out and added to the previously formed yeast suspension. This quantity is 10%, by volume, in excess of the amount required to produce bread containing 500 U. S. P. vitamin $D_2$ units per pound, the excess being added to compensate for possible losses in baking, etc. The concentrate and yeast suspension are stirred together and then mixed with other ingredients required in bread-making to form a dough which may be baked in the customary manner.

It is specifically intended to exclude extracts from natural sources, sometimes called concentrates of vitamin D. The term "concentrate" is there used in a literal sense which implies that a preparation has been extracted from a less potent natural source. We wish to exclude these concentrates since they carry with them objectionable odors and flavors from their original sources, usually fish oils. As compared with the activated ergosterol, used in this invention, the vitamin D of a concentrate is distinct and different which can be demonstrated by biological tests and which has been recognized by authorities in this field. This is further indicated by the fact that the vitamin D of activated ergosterol is known always in the chemical literature as vitamin $D_2$, whereas cod liver oil vitamin is primarily vitamin $D_3$. For example, the article by Rygh, Nature, 136; 3436: 396-7 (1935) calls activated ergosterol, vitamin $D_2$ and this article further points out the non-identity of vitamin $D_2$ and the natural vitamin D from cod liver oil. It is believed that the name "vitamin $D_3$" was first assigned by Windaus, Schenk and Wirder, Hoppe-Seyler's Zeitschrift für Physiologische Chemie, 241: 100-103 (1936). In this article, the name "vitamin $D_3$" is assigned to activated 7-dehydrocholesterol which was shown to be the same as the vitamin D from tuna fish liver oil.

The foregoing detailed description has been given for clearness of understanding only and no unnecessary limitations should be understood therefrom, but it should be construed as broadly as permissible in view of the prior art.

We claim as our invention:

1. A process for the preparation of a stable, sterilized emulsion of vitamin $D_2$ in evaporated milk which comprises dissolving a suitable amount of activated ergosterol in butter-fat or butter-oil, adding a suitable amount of untreated evaporated milk thereto, and passing the product through a homogenizer while subjecting it to a pressure of approximately 4000 to 5000 pounds per square inch, then recirculating the partially homogenized product through the homogenizer while subjecting it to a pressure of approximately 2500 pounds per square inch thereby producing a stable emulsion, and finally canning the product and sterilizing it by heating it to a temperature of about 240° F. for about 20 minutes.

2. A process for the preparation of a stable, sterilized emulsion of vitamin $D_2$ in evaporated milk which comprises dissolving a suitable amount of activated ergosterol in butter-fat or butter-oil, adding a suitable amount of evaporated milk thereto, homogenizing the resultant mixture at a pressure of approximately 4,000 to 5,000 pounds per square inch, subjecting the homogenized mixture to a second homogenization at a pressure of approximately 2500 pounds per square inch, and canning and sterilizing the resultant product.

3. A process for the preparation of a stable, sterilized emulsion of vitamin $D_2$ in evaporated milk which comprises dissolving activated ergosterol in butter-fat or butter-oil, mixing a small quantity of the product with a suitable amount of evaporated milk, homogenizing the resultant mixture at a pressure substantially in excess of that ordinarily employed for the homogenization of evaporated milk and then homogenizing the product at a pressure ordinarily employed in the homogenization of evaporated milk, and canning and sterilizing the resultant product thereby producing a stable, sterilized emulsion of vitamin $D_2$ having a substantially unimpaired vitamin $D_2$ potency.

4. A process for the preparation of a stable, sterilized emulsion of vitamin $D_2$ in evaporated milk which comprises dissolving activated ergosterol in butter-fat or butter-oil, mixing a small quantity of the product with a suitable amount of evaporated milk, homogenizing the resultant mixture at a pressure substantially in excess of that ordinarily employed for the homogenization of evaporated milk, mixing the homogenized product with a further quantity of evaporated milk, and then homogenizing the product at a pressure ordinarily employed in the homogenization of evaporated milk, and canning and sterilizing the resultant product thereby producing a stable, sterilized emulsion of vitamin $D_2$ having a substantially unimpaired vitamin $D_2$ potency.

REGINALD C. SHERWOOD.
CHARLES G. FERRARI.